(12) United States Patent
Khaund

(10) Patent No.: US 6,199,083 B1
(45) Date of Patent: Mar. 6, 2001

(54) COMPUTER IMPLEMENTED METHOD FOR INTERPOLATING A VALUE CORRESPONDING TO A POINT REPRESENTED BY BINARY COORDINATES

(75) Inventor: Sanzib Khaund, Rancho Cordova, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/100,640

(22) Filed: Jun. 19, 1998

(51) Int. Cl.$^7$ .................................................. G06F 7/38
(52) U.S. Cl. ............................................................. 708/290
(58) Field of Search ................................ 708/290; 345/523

(56) References Cited

U.S. PATENT DOCUMENTS

| | | | |
|---|---|---|---|
| 5,345,541 * | 9/1994 | Kelley et al. ................. | 708/290 |
| 5,402,533 * | 3/1995 | Kelley et al. ................. | 708/290 |
| 5,922,043 * | 7/1999 | Mais ............................... | 708/290 |
| 5,935,198 * | 8/1999 | Blomgren ..................... | 708/290 |

* cited by examiner

*Primary Examiner*—Tan V. Mai
(74) *Attorney, Agent, or Firm*—Blakely, Sokloff, Taylor & Zafman LLP (57) ABSTRACT

According to one approach, the present invention is embodied in a computer system and a computer implemented method for interpolating a color value for a pixel that is represented by a pair binary coordinates in a texture map. Each binary coordinate has an integer and a fractional portion. First, the fractional portions of the binary coordinates are multiplied together to generate a first sigma value. A known color value for a first of the four nearest texels is multiplied by the first sigma value to determine the first texel's contribution to the weighted average of the four nearest texels. Next, each bit of the first sigma value is inverted to generate an inverted first sigma value. Then, the fractional portion of one of the binary coordinates is added to the inverted first sigma value to generate a second sigma value. A known color value for a second of the four nearest texels is multiplied by the second sigma value to determine the second texel's contribution to the weighted average. The method continues until the weighted average has been calculated.

45 Claims, 3 Drawing Sheets

COMPUTER IMPLEMENTED METHOD FOR INTERPOLATING A VALUE CORRESPONDING TO A POINT REPRESENTED BY BINARY COORDINATES

FIELD OF THE INVENTION

The present invention relates to the field of computer implemented interpolation methods.

BACKGROUND OF THE INVENTION

Interpolation is a well known procedure for determining a value corresponding to a point based on known values corresponding to surrounding points. Methods and I apparatus for performing interpolation on computer systems can be critical to the user acceptance of certain computer applications.

For instance, many of the most advanced computer applications use three dimensional graphics that require texture mapping, i.e., mapping an image, or a texture map, onto a surface, such as an area in a pixel map to be displayed. A prior approach to texture mapping uses nearest neighbor sampling, wherein a color value for a display pixel is chosen to be the color value for the nearest texel, i.e., the nearest point in the texture map. However, this prior approach can result in undesirable jerky animation, because a small change in the texture map can cause dramatic changes in the nearest pixels.

Smoother animation can be achieved by using an approach involving bilinear interpolation. With bilinear interpolation, a color value for a display pixel is chosen by calculating a weighted average of the four nearest texels. However, using known methods and apparatus for bilinear interpolation on a computer system requires processor intensive iterations that degrade frame rates. Many application developers are unwilling to sacrifice high frame rates for smoother animation. Therefore, a novel approach to bilinear interpolation on a computer system has been developed.

SUMMARY OF THE INVENTION

A method for interpolating a value corresponding to a point represented by at least two binary coordinates, each binary coordinate having a fractional portion, is disclosed. The method includes a computer implemented step of multiplying together the fractional portions of at least two of the binary coordinates to generate a first sigma value. The method also includes the computer implemented steps of inverting each bit of the first sigma value to generate an inverted first sigma value, and adding the fractional portion of at least one of the binary coordinates to the inverted first sigma value to generate a second sigma value.

DETAILED DESCRIPTION OF A PREFERRED EMBODIMENT

A computer implemented method and a computer system for interpolating a value corresponding to a point represented by at least two binary coordinates are described. In the following description, specific details are set forth in order to provide a thorough understanding of the present invention. It will be apparent, however, to one skilled in the art that the present invention can be practiced without regard to these specific details. In other instances, well known concepts have not been described in particular detail in order to avoid obscuring the present invention.

According to one approach, the present invention is embodied in a computer system and a computer implemented method for interpolating a color value for a pixel that is represented by a pair of binary coordinates in a texture map. Each binary coordinate has an integer and a fractional portion. First, the fractional portions of the binary coordinates are multiplied together to generate a first sigma value. A known color value for a first of the four nearest texels is multiplied by the first sigma value to determine the first texel's contribution to the weighted average of the four nearest texels. Next, each bit of the first sigma value is inverted to generate an inverted first sigma value. Then, the fractional portion of one of the binary coordinates is added to the inverted first sigma value to generate a second sigma value. A known color value for a second of the four nearest texels is multiplied by the second sigma value to determine the second texel's contribution to the weighted average. The method continues until the weighted average has been calculated.

Figure 1:
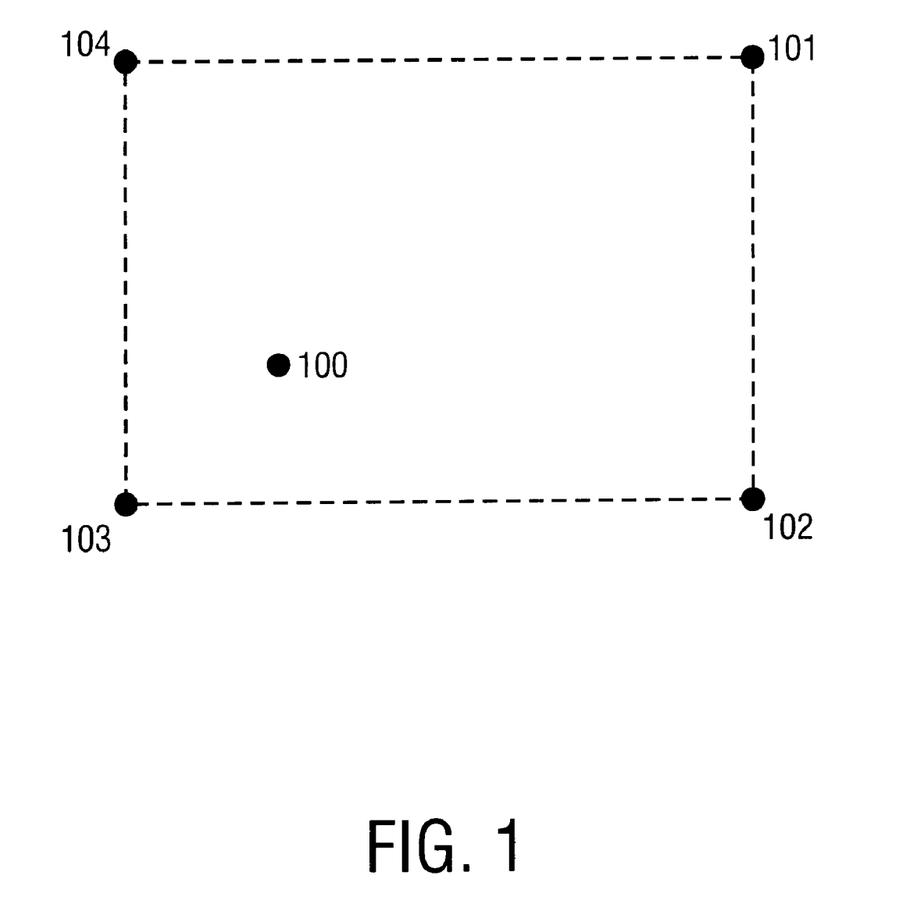
FIG. 1 illustrates a point for which a corresponding color value can be calculated using bilinear interpolation.

To help explain the present invention, the basic principles of bilinear interpolation will be explained with reference to FIG. 1. FIG. 1 illustrates a point 100 for which a corresponding color value can be calculated using bilinear interpolation. Point 100 is represented by coordinates (U.u,V.v). The integer portions of the coordinates of point 100 are U and V, and the fractional portions of the coordinates of point 100 are u and v. The four nearest integer points, i.e. points having both fractional portions of their coordinates equal to zero, are 101, 102, 103, and 104. The coordinates of points 101, 102, 103, and 104 are (U+1,V+1), (U+1,V), (U,V), and (U,V+1), respectively.

A color value can be assigned to point 100 by calculating the weighted average of the color values of points 101, 102, 103, and 104, which have known color values. The following set of equations, wherein the red color values of points 101, 102, 103, and 104 are RA, RB, RC, and RD, respectively, is used to calculate RP, the red color value for point 100:

$$s1=u*v$$

$$s2=u*(1-v)$$

$$s3=(1-u)*(1-v)$$

$$s4=(1-u)*v$$

$$RP=RA*s1+RB*s2+RC*s3+RD*s4$$

The variables s1, s2, s3, and s4 are referred to as sigma values. In a typical computer system using an RGB (red, green,blue) color model, the following two equations, wherein the green color values of points 101, 102, 103, and 104 are GA, GB, GC, and GD, respectively, and the blue color values of points 101, 102, 103, and 104 are BA, BB, BC, and BD, respecively, are added to the set to calculate GP, the green color value for point 100, and BP, the blue color value for point 100:

$$GP=GA*s1+GB*s2+GC*s3+GD*s4$$

$$BP=BA*s1+BB*s2+BC*s3+BD*s4$$

The full set of equations includes sixteen multiply operations, each of which must be executed in a prior approach to bilinear interpolation. Therefore, using this prior approach to calculate RGB values for texture mapping can be so processor intensive that frame rates are degraded.

One advantage of the present invention is that the sigma values can be calculated using a single multiply operation. After multiplying out the factors, the equations for the sigma values are:

$$s1 = u*v$$
$$s2 = u - u*v$$
$$s3 = 1 - u - v + u*v$$
$$s4 = v - u*v$$

Figure 2:
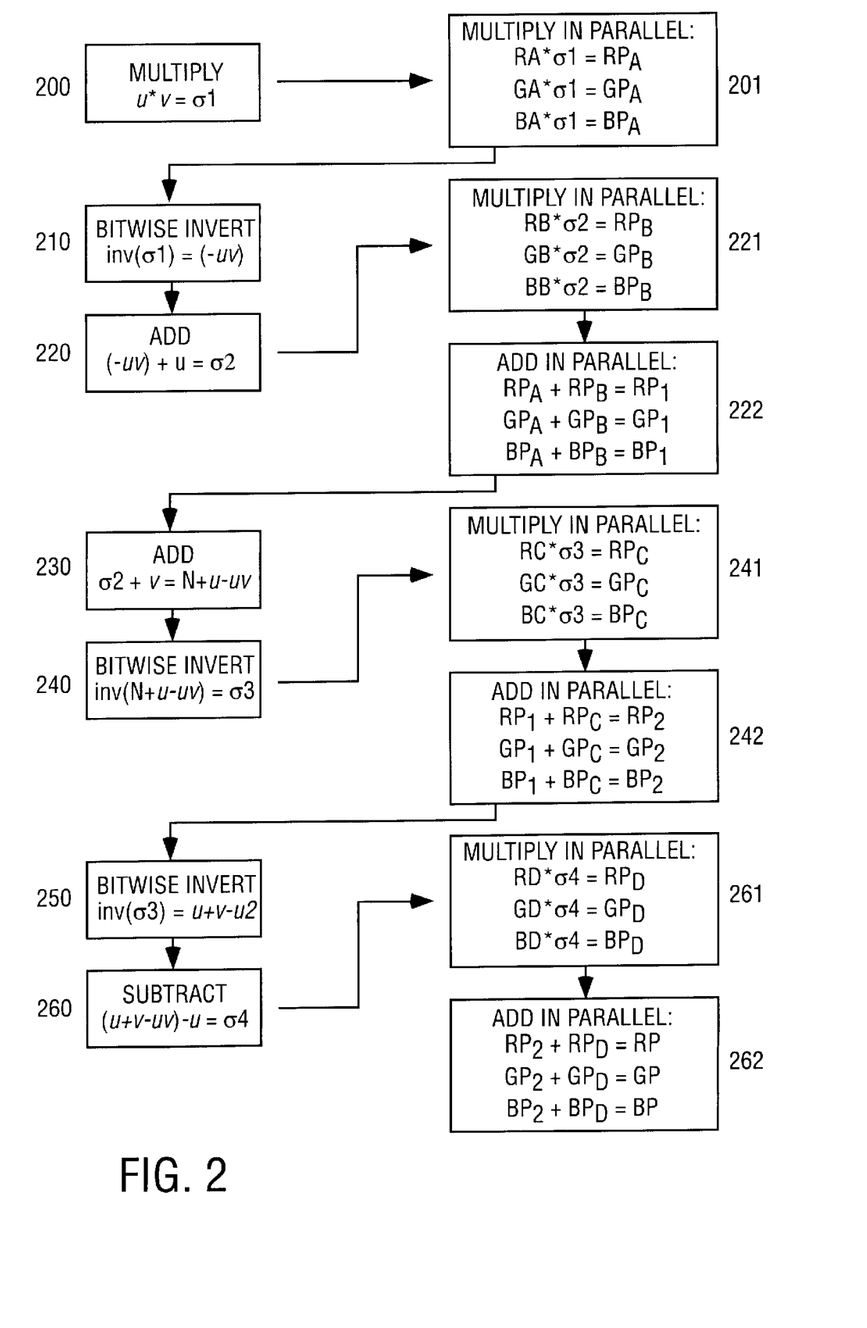
FIG. 2 is a flow chart illustrating one embodiment of the method of the present invention.

Although each equation still includes a multiply operation, each equation can now use the same multiply operation. This multiply operation, u*v, is performed in step 200 in FIG. 2, a flow chart illustrating one embodiment of the method of the present invention. In FIG. 2, u and v are binary fractions having any number of bits. In one embodiment, u and v each have sixteen bits. The first sigma value, s1, is generated by the multiply operation of step 200.

Although all four equations use the product term that is generated in step 200, two of the equations require the positive value of the product term while the other two require the negative value. To efficiently deal with this situation, the present invention takes advantage of the principle that the sum of a binary fraction and its bitwise inverse is approximately equal to one. The bitwise inverse of a binary fraction is obtained by inverting each bit of the binary fraction, and the operation on a binary fraction f will be referred to herein as inv(f). For example, decimal 0.625 expressed as a four digit binary fraction is 1010, and inv(1010) is 0101. When a binary fraction is added to its bitwise inverse, every bit in the result is a one, so the result is one minus the place value of the least significant bit, or approximately one.

Applying this principle, an inverted first sigma value can be generated by inverting each bit of the first sigma value in step 210, then the second sigma value, s2, is generated by adding u to the inverted first sigma value in step 220. Together, these two steps are approximately equivalent to subtracting u*v from u. This approximate equivalence exists for two reasons. The first reason is that based on the principle explained above, ((u*v)+inv(u*v)) approximately equals one, so (u+inv(u*v)) approximately equals (u+1−(u*v)). The second reason is that only the fractional portions of the binary numbers that we are dealing with are being used, and the fractional portion of (u+1−(u*v)) is equal to (u−(u*v)). Because we are only interested in the fractional portions of binary numbers, the addition operation in step 220 can be performed in more than one way. In one approach, the carryout from the high order bit can be ignored. In another approach, referred to as wraparound addition, the carryout from the high order bit can be added to the low order bit of the result. Using this latter approach is preferred because wraparound addition eliminates the approximation, i.e. when wraparound addition is used, (u+inv(u*v)) equals (u+1−(u*v)) without approximation.

The principle explained above can be used again to generate the third sigma value, s3. First, in step 230, v is added to the second sigma value to generate an inverted third sigma value. Then, in step 240, each bit of the inverted third sigma value is inverted to generate s3. To explain, s3 equals (1−u−v+(u*v)), which equals (1−(u+v−(u*v))), which is approximately equal to inv(u+v−(u*v)). If desired, a constant, for example, a constant having a value equal to the place value of the least significant bit of the binary fractions, could be added to the result of step 240 to eliminate the approximation.

Finally, the fourth sigma value, s4, can be generated by inverting each bit of s3, as in step 250, to regenerate the inverted third sigma value, then subtracting u, as in step 260.

Many alternatives to the method described above are possible within the scope of the present invention. In one alternative method, s4 is generated prior to s2 by adding v instead of u in step 220. Then, in step 230, u is added instead of v. Finally, in step 260, v is subtracted instead of u to generate s2 instead of s4. Another alternative method begins with step 200, but step 210 is replaced with a step wherein u is subtracted from s1 to generate an inverted second sigma value, and step 220 is replaced with a step wherein each bit of the inverted second sigma value is inverted to generate the second sigma value. A wraparound subtraction, wherein the carryin to the highest order bit of s1 is subtracted from the lowest order bit of the result, is preferred to eliminate the approximation in the same manner that wraparound addition eliminates the approximation in the original step 220. In another alternative method, s4 is generated prior to s3 by deleting steps 240 and 250, performing step 260, then performing a step wherein u is added to s4 to generate an inverted third sigma value, then performing a step wherein each bit of the inverted third sigma value is inverted to generate s3.

Another advantage of the present invention is that each step involved in calculating the sigma values uses only the result generated by the previous step and perhaps a constant or one or both of the original variables, u and v. In other words, the product term generated by the single multiply operation does not have be saved in a separate register. To extend the benefit of using only one register to calculate the sigma values to the calculation of a color value for point 100, a running sum of the color value can be maintained as described below in conjunction with FIG. 2.

In step 201, a known color value for point 101, for example, RA, the red color value for point 101, is multiplied by s1 to generate $RP_A$, a first red partial color value. In step 221, RB, the red color value for point 102, is multiplied by s2 to generate $RP_B$, a second red partial color value. In step 222, $RP_B$ is added to $RP_A$ to generate $RP_1$, a first red running sum color value. In step 241, RC, the red color value for point 103, is multiplied by s3 to generate $RP_C$, a third red partial color value. In step 242, $RP_C$ is added to RP, to generate $RP_2$, a second red running sum color value. In step 261, RD, the red color value for point 104, is multiplied by s4 to generate $RP_D$, a fourth red partial color value. In step 262, $RP_D$ is added to $RP_2$ to generate RP, the red color value for point P.

When more than one color value is to be calculated, for example, in a typical computer system using an RGB color model, each of the red partial color values can be calculated in parallel with the corresponding green and blue partial color values.

Therefore, in step 201, GA, the green color value for point 101, is multiplied by s1 to generate $GP_A$, a first green partial color value, and likewise for blue. In step 221, GB, the green color value for point 102, is multiplied by s2 to generate $GP_B$, a second green partial color value, and likewise for blue. In step 222, $GP_B$ is added $GP_A$ to generate $GP_1$, a first green running sum color value, and likewise for blue. In step 241, GC, the green color value for point 103, is multiplied by s3 to generate a $GP_3$, a third green partial color value, and likewise for blue. In step 242, $GP_3$ is added to GP, to generate $GP_2$, a second green running sum color value, and likewise for blue. In step 261, GD, the green color value for point 104, is multiplied by s4 to generate $GP_D$, a fourth green partial color value, and likewise for blue. In step 262, $GP_D$ is added to $GP_2$ to generate the GP, the green color value for point P, and likewise for blue. Parallel calculation of the partial color values and of the running sum color values is preferred to reduce the total latency of the interpolation method.

To facilitate these parallel calculations of the partial color values, three copies of the sigma values can be calculated in parallel. In one embodiment, an identical sequence of operations is performed in parallel on the contents of three separate registers in order to obtain three identical copies of each sigma value. In another embodiment, a sequence of operations is performed on the contents of one register that is divided into at least three groups of bits, where an identical copy of each sigma value is obtained in at least three of the groups of bits. However, the method of present invention is not limited to calculating three color values for a point in parallel, but can be used to calculate any number of color, or other values for a point, in parallel or in series. Therefore, any number of copies of the sigma values can be calculated, in parallel or in series.

Figure 3:
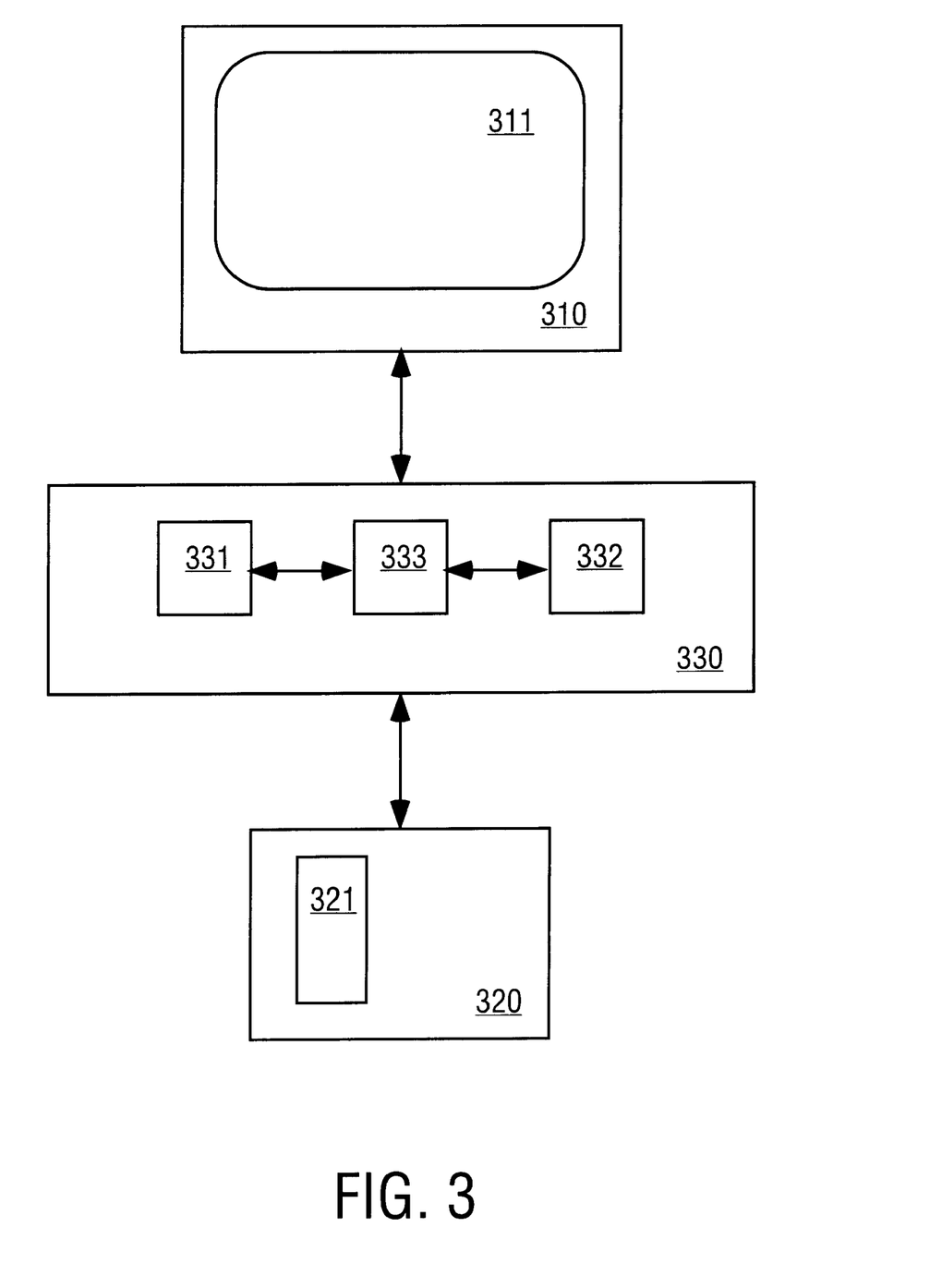
FIG. 3 is a block diagram of a computer system, illustrating one embodiment of the apparatus of the present invention.

FIG. 3 is a block diagram of a computer system according to one embodiment of the present invention. Computer system 300 includes output device 310, storage device 320, and processor 330. Processor 330 is coupled to both output device 310 and storage device 320.

Output device 310 can be any device for outputting data from a computer system, such as, but not limited to, a cathode ray tube display, a liquid crystal display, any type of display, or a printer. In embodiment of FIG. 3, output device 310 is a device configured to display image 311 representing a pixel map. In the pixel map, each pixel is represented by at least two binary coordinates as described above.

Storage device 320 can be any device for storing data in a computer system, such as, but not limited to, read only memory, random access memory, flash memory, or a magnetic or optical storage device. In one embodiment, storage device 320 has stored therein routine 321 for interpolating a value for a pixel in the pixel map. In one embodiment, routine 321 is data representing a sequence of instructions.

Processor 330 can be any type of computer processing unit, such as, but not limited to, a processor supporting a complex or a reduced instruction set computer architecture or a very long instruction word architecture. Processor 330 can be implemented in any form, including one or more integrated circuits. In the embodiment of FIG. 3, processor 330 includes instruction decode unit 331, register unit 332, and execution unit 333. Processor 330 can also include additional circuitry. Decode unit 331 is used for decoding instructions received by processor 330 into control signals and/or microcode entry points. Register unit 332 is used for storing data, such as the u, v, sigma, and color values described above. Execution unit 333 is used for executing instructions, such as instructions corresponding to the bitwise inverse and the wraparound add operations described above, in response to control signals and/or microcode entry points generated by decode unit 331. Register unit 332 can be the source and/or the destination for the data upon which these instructions are executed. Decode unit 310, register unit 320, execution unit 330, and any other circuitry within processor 300 can be implemented using any well known technique.

Routine 321, when executed by processor 330, causes processor 330 to perform the steps of any method for interpolating a value described above, or any other method equivalent to any method described above. Accordingly, processor 330 includes circuitry for executing the steps of at least any one of the methods for interpolating a value described above, or at least one of any other method equivalent to any method described above.

The present invention can also be embodied in a machine-readable medium, such as, but not limited to, any type of magnetic or optical data storage media including a removable disk, where the medium is storing data representing a sequence of instructions, which when executed by a processor, causes the processor to perform the steps of any method for interpolating a value described above, or any other method equivalent to any method described above.

Thus, the exemplary embodiments of the present invention illustrated by FIGS. 2 and 3 have been described. However, the invention is not limited to these embodiments or any of the details described. For example, the interpolation is not limited to two dimensions, for the invention can be practiced in an embodiment wherein a value for point 100 is interpolated from values corresponding to points surrounding point 100 in three or more dimensions. Also, the value to be interpolated for point 100 is not limited to an RGB color value, for the invention can be practiced in an embodiment wherein the value to be interpolated can be any other color value or any other value corresponding to point 100. Also, the interpolation is not limited to a use wherein the value corresponds to a pixel in a pixel map to be displayed, for the invention can be practiced in an embodiment wherein the value can correspond to any point, such as a point in a bitmap to be printed. The specification and drawings must be regarded in an illustrative rather than a restrictive sense. The scope of the invention is defined by the following claims.

What is claimed is:

1. A method for presenting an interpolated pixel color value on a display of a computer system, the interpolated pixel color value corresponding to a point that is represented by at least two binary coordinates, each binary coordinate having a fractional portion, the method comprising:
    A) multiplying together the fractional portions of at least two of the binary coordinates to generate a first sigma value;
    B) inverting each bit of the first sigma value to generate an inverted first sigma value;
    C) adding the fractional portion of at least one of the binary coordinates to the inverted first sigma value to generate a second sigma value; and
    D) presenting the interpolated pixel color value on the display of the computer system.

2. The method of claim 1 wherein step (C) comprises wraparound adding the fractional portion of at least one of the binary coordinates to the first sigma value.

3. The method of claim 1 further comprising:
    A1) multiplying a first value by the first sigma value to generate a first partial value, the first value corresponding to a first of the group of four integer points nearest to the point;
    C1) multiplying a second value by the second sigma value to generate a second partial value, the second value corresponding to a second of the group of four integer points nearest to the point; and
    C2) adding the second partial value to the first partial value.

4. The method of claim 3 wherein:
    step (A1) comprises multiplying the first value by the first sigma value to generate the first partial value in parallel with multiplying a third value by the first sigma value to generate a third partial value, the first and third values corresponding to a first of the group of four integer points nearest to the point; and step (C1) comprises multiplying the second value by the second sigma value to generate the second partial value in parallel with multiplying a fourth value by the second sigma value to generate a fourth partial value, the second and fourth values corresponding to a second of the group of four integer points nearest to the point.

5. The method of claim 1 further comprising:
E) adding the fractional portion of at least one of the binary coordinates to the second sigma value to generate an inverted third sigma value; and
F) subtracting the fractional portion of at least one of the binary coordinates from the inverted third sigma value to generate a fourth sigma value.

6. The method of claim 5 further comprising:
E1) inverting each bit of the inverted third sigma value to generate a third sigma value; and
E2) inverting each bit of the third sigma value to regenerate the inverted third sigma value.

7. The method of claim 5 further comprising:
G) adding the fractional portion of at least one of the binary coordinates to the fourth sigma value to regenerate the inverted third sigma value; and
H) inverting each bit of the inverted third sigma value to generate a third sigma value.

8. A method for presenting an interpolated pixel color value on a display of a computer system, the interpolated pixel color value corresponding to a point that is represented by at least two binary coordinates, each binary coordinate having a fractional portion, the method comprising:
A) multiplying together the fractional portions of at least two of the binary coordinates to generate a first sigma value;
B) subtracting the fractional portion of at least one of the binary coordinates from the first sigma value to generate a second sigma value;
C) inverting each bit of the second sigma value to generate an inverted second sigma value; and
D) presenting the interpolated pixel color value on the display of the computer system.

9. The method of claim 8 wherein step (B) comprises wraparound subtracting the fractional portion of at least one of the binary coordinates from the first sigma value.

10. A method for presenting an interpolated pixel color value on a display of a computer system, the interpolated pixel color value corresponding to a point that is represented by at least two binary coordinates, each binary coordinate having a fractional portion, the method comprising:
A) multiplying together the fractional portions of the binary coordinates to generate a first sigma value;
B) inverting each bit of the first sigma value to generate an inverted first sigma value;
C) adding the fractional portion of a first of the pair of binary coordinates to the inverted first sigma value to generate a second sigma value;
D) adding the fractional portion of a second of the pair of binary coordinates to the second sigma value to generate an inverted third sigma value;
E) inverting each bit of the inverted third sigma value to generate a third sigma value; and
F) presenting the interpolated pixel color value on the display of the computer system.

11. The method of claim 10, wherein step (C) comprises wraparound adding the factional portion of a first of the pair of binary coordinates to the first sigma value.

12. A method for presenting an interpolated pixel color value on a display of a computer system, the interpolated pixel color value corresponding to a point in a texture map represented by binary coordinates U.u and V.v, the method comprising:
A) multiplying together the fractional portions u and v of the pair of binary coordinates to generate a first sigma value;
B) multiplying a first color value corresponding to a first point in the texture map by the first sigma value to generate a first partial color value, the first point represented by binary coordinates U+1 and V+1;
C) inverting each bit of the first sigma value to generate an inverted first sigma value;
D) adding the fractional portion u of the first of the binary coordinates to the inverted first sigma value to generate a second sigma value;
E) multiplying a second color value corresponding to a second point in the texture map by the second sigma value to generate a second partial color value, the second point represented by binary coordinates U+1 and V;
F) adding the second partial color value to the first partial color value to generate a first running sum color value;
G) adding the fractional portion v of the second of the binary coordinates to the second sigma value to generate an inverted third sigma value;
H) inverting each bit of the inverted third sigma value to generate a third sigma value;
I) multiplying a third color value corresponding to a third point in the texture map by the third sigma value to generate a third partial color value, the third point represented by binary coordinates U and V;
J) adding the third partial color value to the first running sum color value to generate a second running sum color value;
K) inverting each bit of the third sigma value to regenerate the inverted third sigma value;
L) subtracting the fractional portion u of the first of the binary coordinates from the inverted third sigma value to generate a fourth sigma value;
M) multiplying a fourth color value corresponding to a fourth point in the texture map by the fourth sigma value to generate a fourth partial color value, the fourth point represented by binary coordinates U and V+1;
N) adding the fourth partial color value to the second running sum color value to generate the color value for the pixel; and
O) presenting the interpolated pixel color value on the display of the computer system.

13. The method of claim 12 wherein step (D) comprises wraparound adding the fractional portion u of the first of the binary coordinates to the inverted first sigma value.

14. The method of claim 12 wherein step (B) comprises multiplying the first color value by the first sigma value to generate the first partial color value in parallel with multiplying a fifth color value by the first sigma value to generate a fifth partial color value, the first and fifth color values corresponding to a first point in the texture map represented by binary coordinates U+1 and V+1.

15. A machine-readable medium having stored thereon data representing a sequence of instructions for interpolating a value corresponding to a point represented by at least two binary coordinates, each binary coordinate having a fractional portion, the sequence of instructions, when executed by a processor, causes the processor to:

A) multiply together the fractional portions of at least two of the binary coordinates to generate a first sigma value;

B) invert each bit of the first sigma value to generate an inverted first sigma value; and C) add the fractional portion of at least one of the binary coordinates to the inverted first sigma value to generate a second sigma value.

16. The machine-readable medium of claim 15, wherein the instructions further comprise instructions causing the processor to:

D) present the interpolated value on an output device associated with the processor.

17. The machine-readable medium of claim 16, wherein the instructions further comprise instructions causing the processor to:

E) add the fractional portion of at least one of the binary coordinates to the second sigma value to generate an inverted third sigma value; and F) subtract the fractional portion of at least one of the binary coordinates from the inverted third sigma value to generate a fourth sigma value.

18. The machine-readable medium of claim 17, wherein the instructions to add further comprise instructions causing the processor to wraparound add the fractional portion of at least one of the binary coordinates to the first sigma value.

19. A computer system for interpolating a value corresponding to a point that is represented by at least two binary coordinates, each binary coordinate having a fractional portion, the system comprising a processor to:

multiply together the fractional portions of at least two of the binary coordinates to generate a first sigma value;

invert each bit of the first sigma value to generate an inverted first sigma value; and add the fractional portion of at least one of the binary coordinates to the inverted first sigma value to generate a second sigma value.

20. The computer system of claim 19, wherein the processor is further operable to:

add the fractional portion of at least one of the binary coordinates to the second sigma value to generate an inverted third sigma value; and subtract the fractional portion of at least one of the binary coordinates from the inverted third sigma value to generate a fourth sigma value.

21. The computer system of claim 19, further comprising an output device to present the interpolated value.

22. A machine-readable medium having stored thereon data representing a sequence of instructions for presenting an interpolated pixel color value on a display, the interpolated pixel color value corresponding to a point that is represented by at least two binary coordinates, each binary coordinate having a fractional portion, the sequence of instructions, when executed by a processor, causes the processor to:

multiply together the fractional portions of at least two of the binary coordinates to generate a first sigma value;

invert each bit of the first sigma value to generate an inverted first sigma value;

add the fractional portion of at least one of the binary coordinates to the inverted first sigma value to generate a second sigma value; and present the interpolated pixel color value on the display.

23. The machine-readable medium of claim 22, wherein the instructions further comprise instructions causing the processor to:

add the fractional portion of at least one of the binary coordinates to the second sigma value to generate an inverted third sigma value; and subtract the fractional portion of at least one of the binary coordinates from the inverted third sigma value to generate a fourth sigma value.

24. The machine-readable medium of claim 22, wherein the instructions to add further comprise instructions causing the processor to wraparound add the fractional portion of at least one of the binary coordinates to the first sigma value.

25. A computer system for presenting an interpolating pixel color value on a display, the interpolated pixel color value corresponding to a point that is represented by at least two binary coordinates, each binary coordinate having a fractional portion, the system comprising a processor to:

multiply together the fractional portions of at least two of the binary coordinates to generate a first sigma value;

invert each bit of the first sigma value to generate an inverted first sigma value; and add the fractional portion of at least one of the binary coordinates to the inverted first sigma value to generate a second sigma value; and the computer system further comprising a display to present the interpolated pixel color value.

26. The computer system of claim 25, wherein the processor is further operable to:

add the fractional portion of at least one of the binary coordinates to the second sigma value to generate an inverted third sigma value; and subtract the fractional portion of at least one of the binary coordinates from the inverted third sigma value to generate a fourth sigma value.

27. A method for presenting an interpolated color value on a printer of a computer system, the interpolated color value corresponding to a point that is represented by at least two binary coordinates, each binary coordinate having a fractional portion, the method comprising:

multiplying together the fractional portions of at least two of the binary coordinates to generate a first sigma value;

inverting each bit of the first sigma value to generate an inverted first sigma value;

adding the fractional portion of at least one of the binary coordinates to the inverted first sigma value to generate a second sigma value; and presenting the interpolated color value on the printer of the computer system.

28. The method of claim 27, further comprising wraparound adding the fractional portion of at least one of the binary coordinates to the first sigma value.

29. The method of claim 27 further comprising:

multiplying a first value by the first sigma value to generate a first partial value, the first value corresponding to a first of the group of four integer points nearest to the point;

multiplying a second value by the second sigma value to generate a second partial value, the second value corresponding to a second of the group of four integer points nearest to the point; and adding the second partial value to the first partial value.

30. The method of claim 29, further comprising:

multiplying the first value by the first sigma value to generate the first partial value in parallel with multiplying a third value by the first sigma value to generate a third partial value, the first and third values corresponding to a first of the group of four integer points nearest to the point; and multiplying the second value by the second sigma value to generate the second partial value in parallel with multiplying a fourth value by the second sigma value to generate a fourth partial value, the second and fourth values corresponding to a second of the group of four integer points nearest to the point.

31. The method of claim 27 further comprising:

adding the fractional portion of at least one of the binary coordinates to the second sigma value to generate an inverted third sigma value; and subtracting the fractional portion of at least one of the binary coordinates from the inverted third sigma value to generate a fourth sigma value.

32. The method of claim 31 further comprising:

inverting each bit of the inverted third sigma value to generate a third sigma value; and inverting each bit of the third sigma value to regenerate the inverted third sigma value.

33. The method of claim 31 further comprising:

adding the fractional portion of at least one of the binary coordinates to the fourth sigma value to regenerate the inverted third sigma value; and inverting each bit of the inverted third sigma value to generate a third sigma value.

34. A method for presenting an interpolated color value on a printer of a computer system, the interpolated color value corresponding to a point that is represented by at least two binary coordinates, each binary coordinate having a fractional portion, the method comprising:

multiplying together the fractional portions of at least two of the binary coordinates to generate a first sigma value;

subtracting the fractional portion of at least one of the binary coordinates from the first sigma value to generate a second sigma value;

inverting each bit of the second sigma value to generate an inverted second sigma value; and presenting the interpolated color value on the printer of the computer system.

35. The method of claim 34, further comprising wraparound subtracting the fractional portion of at least one of the binary coordinates from the first sigma value.

36. A method for presenting an interpolated color value on a printer of a computer system, the interpolated color value corresponding to a point that is represented by at least two binary coordinates, each binary coordinate having a fractional portion, the method comprising:

multiplying together the fractional portions of the binary coordinates to generate a first sigma value;

inverting each bit of the first sigma value to generate an inverted first sigma value;

adding the fractional portion of a first of the pair of binary coordinates to the inverted first sigma value to generate a second sigma value;

adding the fractional portion of a second of the pair of binary coordinates to the second sigma value to generate an inverted third sigma value;

inverting each bit of the inverted third sigma value to generate a third sigma value; and presenting the interpolated color value on the printer of the computer system.

37. The method of claim 36, further comprising wraparound adding the factional portion of a first of the pair of binary coordinates to the first sigma value.

38. A machine-readable medium having stored thereon data representing a sequence of instructions for presenting an interpolated color value on a printer, the interpolated color value corresponding to a point that is represented by at least two binary coordinates, each binary coordinate having a fractional portion, the sequence of instructions, when executed by a processor, causes the processor to:

multiply together the fractional portions of at least two of the binary coordinates to generate a first sigma value;

invert each bit of the first sigma value to generate an inverted first sigma value;

add the fractional portion of at least one of the binary coordinates to the inverted first sigma value to generate a second sigma value; and present the interpolated color value on the printer.

39. The machine-readable medium of claim 38, wherein the instructions further comprise instructions causing the processor to:

add the fractional portion of at least one of the binary coordinates to the second sigma value to generate an inverted third sigma value; and subtract the fractional portion of at least one of the binary coordinates from the inverted third sigma value to generate a fourth sigma value.

40. The machine-readable medium of claim 39, wherein the instructions to add further comprise instructions causing the processor to wraparound add the fractional portion of at least one of the binary coordinates to the first sigma value.

41. A computer system for presenting an interpolating color value on a printer, the interpolated color value corresponding to a point that is represented by at least two binary coordinates, each binary coordinate having a fractional portion, the system comprising a processor to:

multiply together the fractional portions of at least two of the binary coordinates to generate a first sigma value;

invert each bit of the first sigma value to generate an inverted first sigma value; and add the fractional portion of at least one of the binary coordinates to the inverted first sigma value to generate a second sigma value; and the computer system further comprising a printer to present the interpolated color value.

42. The computer system of claim 41, wherein the processor is further operable to:

add the fractional portion of at least one of the binary coordinates to the second sigma value to generate an inverted third sigma value; and subtract the fractional portion of at least one of the binary coordinates from the inverted third sigma value to generate a fourth sigma value.

43. A method of interpolating color components of a pixel for presentation on an output device, the method comprising:

generating a first sigma value by multiplying together fractional portions of two or more binary coordinates associated with the pixel;

generating a second sigma value based upon the first sigma value and one of the fractional portions of the binary coordinates; and determining interpolated color values for the pixel based in part upon the first sigma value, the second sigma value, and known color values of neighboring points.

44. The method of claim 43, further comprising:

multiplying a first color component value by the first sigma value to generate a first partial value, the first color component value corresponding to a first point of a group of four integer points nearest to the pixel;

multiplying a second color component value by the second sigma value to generate a second partial value, the second color component value corresponding to a second point of the group of four integer points nearest to the pixel; and adding the second partial value to the first partial value.

45. The method of claim 43, further comprising:

adding the fractional portion of at least one of the binary coordinates to the second sigma value to generate an inverted third sigma value; and subtracting the fractional portion of at least one of the binary coordinates from the inverted third sigma value to generate a fourth sigma value.

* * * * *